United States Patent [19]

Taylor et al.

[11] Patent Number: 4,518,240

[45] Date of Patent: May 21, 1985

[54] PHOTOGRAPHIC PRINT MAKING AND DEVELOPING TRAY ASSEMBLY

[75] Inventors: Charles E. Taylor, Westlake Village; Stanley A. Wnukiewicz, Jr., Woodland Hills; Anton Gattiker, Playa Del Ray, all of Calif.

[73] Assignee: Phase One Products Corporation, Westlake Village, Calif.

[21] Appl. No.: 516,929

[22] Filed: Jul. 25, 1983

[51] Int. Cl.[3] .......................... G03B 3/06; G03B 13/04

[52] U.S. Cl. .................................... 354/312; 354/324; 354/331; 354/336

[58] Field of Search ............... 354/307, 312, 315, 316, 354/323, 327, 331, 333, 335, 337, 324; 355/27

[56] References Cited

U.S. PATENT DOCUMENTS

| | | | |
|---|---|---|---|
| 722,052 | 3/1903 | Sloan . | |
| 2,930,306 | 3/1960 | Goodman | 354/307 |
| 3,465,664 | 9/1969 | Bochman | 354/312 |
| 3,644,036 | 2/1972 | Canfield | 354/312 |
| 3,722,394 | 3/1973 | Sebastian | 354/331 |
| 3,903,540 | 9/1975 | Hampl | 354/312 |
| 4,104,671 | 8/1978 | Harrigan . | |
| 4,138,689 | 2/1979 | Montalbano . | |
| 4,143,976 | 3/1979 | Paterson et al. . | |
| 4,157,868 | 6/1979 | Needleman | 354/307 |
| 4,332,455 | 6/1982 | Stettner | 354/335 |

*Primary Examiner*—A. A. Mathews
*Attorney, Agent, or Firm*—Jack C. Munro

[57] ABSTRACT

A photographic print and developing tray which is to removably connect to the bottom of the base of a photographic enlarger. The photographic enlarger is to utilize a photographic transparency which is to be projected onto an unexposed photographic paper mounted within the photographic print and developing tray. The photographic print and developing tray includes a removable cover which is removed during exposure of the photographic paper. The tray is to accommodate photographic print developing liquid. The liquid is to be supplied to the tray through a dispenser. The dispenser includes a spout which to tightly engage with the tray. The dispenser also includes a manually operable valve which is to be movable from a closed position to an open position to permit moving of liquid between the tray and the dispenser.

12 Claims, 15 Drawing Figures

PHOTOGRAPHIC PRINT MAKING AND DEVELOPING TRAY ASSEMBLY

BACKGROUND OF THE INVENTION

The field of this invention relates to photographic printing and more particularly to a developing tray for producing either a black and white or color photographic print.

Recently there has been increased public interest in photography as a hobby. Home printing of pictures has increased significantly. The typical tools of a photographer are a darkroom and associated darkroom equipment which includes processing equipment.

The use of a darkroom is normally a necessity to perform the photographic processes to create durable pictures from light images. The darkroom is a fixed, enclosed area, generally a room in a house or building from which all outside light can be excluded. This darkroom requires a considerable amount of space. It is generally impractical, particularly for non-professional photographers, to set aside such space for this purpose alone. The darkroom is probably the greatest obstacle preventing people from enjoying photography as a hobby. Many dwellings, particularly apartments, simply are not large enough to allow an entire room to be continuely used as a darkroom. The part-time use of a bathroom or a closet necessitates bothersome and time consuming packing and unpacking of photographic equipment before and after use.

Instead of the individual having to utilize outside reproduction facilities or a darkroom, it would be a great advantage to utilize a compact, portable photographic print maker which could be utilized within the individual's home or apartment, easy to operate by a person of minimal skill and training, which produces a print in a short period of time and which can be manufactured at relatively minimal cost.

A portable photographic print maker which avoids the use of outside reproduction facilities or a darkroom is shown and described within U.S. patent application Ser. No. 479,037, filed Mar. 25, 1983, entitled COMBINED PHOTOGRAPHIC ENLARGER AND PRINT DEVELOPING TRAY.

The print developing tray within the aforementioned patent application includes a movable cover which is to be moved from a closed position to an open position and when in the open position exposes an internal chamber of the tray. With the cover in the closed position, the internal chamber is light-tight and liquid-tight. The normal use of the tray is to be connected with a photographic enlarger unit, such as is disclosed within the aforementioned patent application, and the cover is to be moved at the appropriate time to expose a photographic transparency onto an unexposed photographic print which has been previously loaded within the tray. The tray is to then be removed from the photographic enlarger and the print subsequently developed. The print is developed without being removed from the tray. The tray includes a chamber within which is to be located a developing liquid. This developing liquid is then moved to be in contact with the now-exposed print. After the print is developed, the liquid is first removed from the tray and then the now developed print is removed from the tray. The print is removed from the tray by removing the cover of the tray.

SUMMARY OF THE INVENTION

The structure of the present invention relates to an improved version of the aforementioned print developing tray which is described and claimed within the aforementioned patent application. This print developing tray takes the form of a housing which has an internal chamber. The internal chamber can be light-tight and liquid-tight by mounting a cover on the housing. The light-tight, liquid-tight connection of the cover to the housing is accomplished through the use of a stepped rail assembly and groove assembly formed within the housing which is to engage with the edges of the cover. The housing includes a liquid receiving opening which connects with a liquid containing channel located within the internal chamber. The improvements relating to the print developing tray are directed to a handle which is mounted on the cover, which is to be manually operable in conjunction with an enlarged protuberance assembly mounted on the housing. The handle and protuberance is to work in conjunction with the user's hand to facilitate initial movement of the cover from the closed position toward the open position. The internal chamber is to be specially configured to connect with a plurality of different inserts. Each insert is designed to specifically connect with a specifically sized unexposed photographic print. If one particular insert is located within the internal chamber, then a particular sized photographic print will be produced. If another insert is located within the internal chamber, then another size of photographic print will be produced. To facilitate positioning of the image from the slide that is to be reproduced, there is located on the exterior surface of the cover a particular focusing target. A developing liquid dispenser, which has a dispensing spout, is to tightly engage with the liquid receiving opening formed within the cover of the print developing tray. A valve assembly is included within the dispenser which is to be movable between an open position (permitting flow of liquid between the dispenser and the internal chamber) and a closed position (preventing flow of liquid therebetween).

The primary objective of this invention is to construct a photographic print making and developing tray assembly which can be operated by an individual with minimum skill or training.

Another primary objective of the present invention is to construct a print making and developing tray which can be used without the need of a darkroom or any other exterior facility in order to reproduce the photographic print.

Another objective of this invention is to construct a photographic print making and developing tray which causes the photographic print to be reproduced in a very short period of time.

Another objective of this invention is to construct a photographic print making and developing tray which minimizes the user's exposure, as through spillage, to developing liquids during the developing process.

Figure 1:
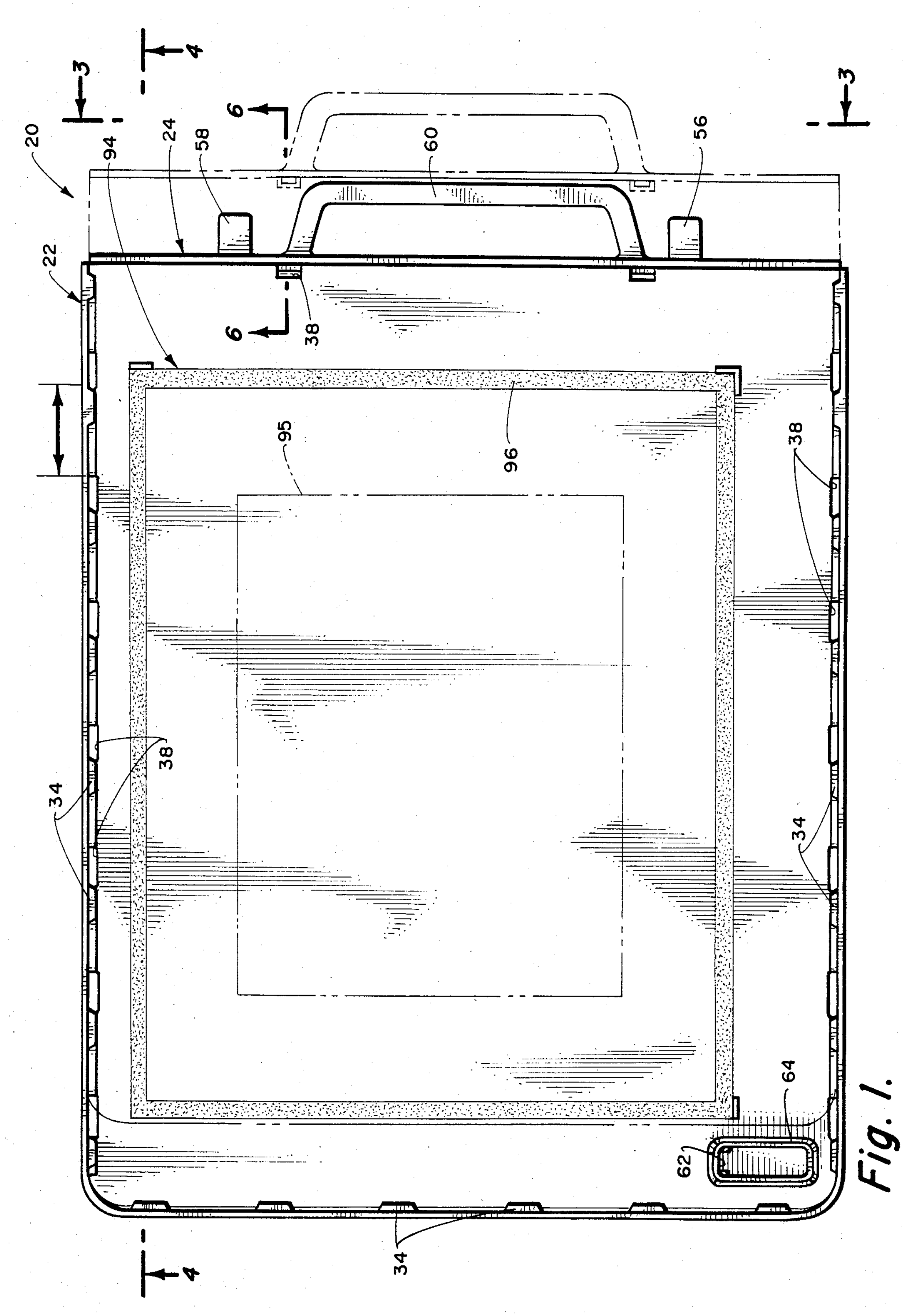
FIG. 1 is a top, plan view of the print making and developing tray of the present invention showing the removable cover in the closed position but depicting movement to the open position in dotted lines.
Figure 2:
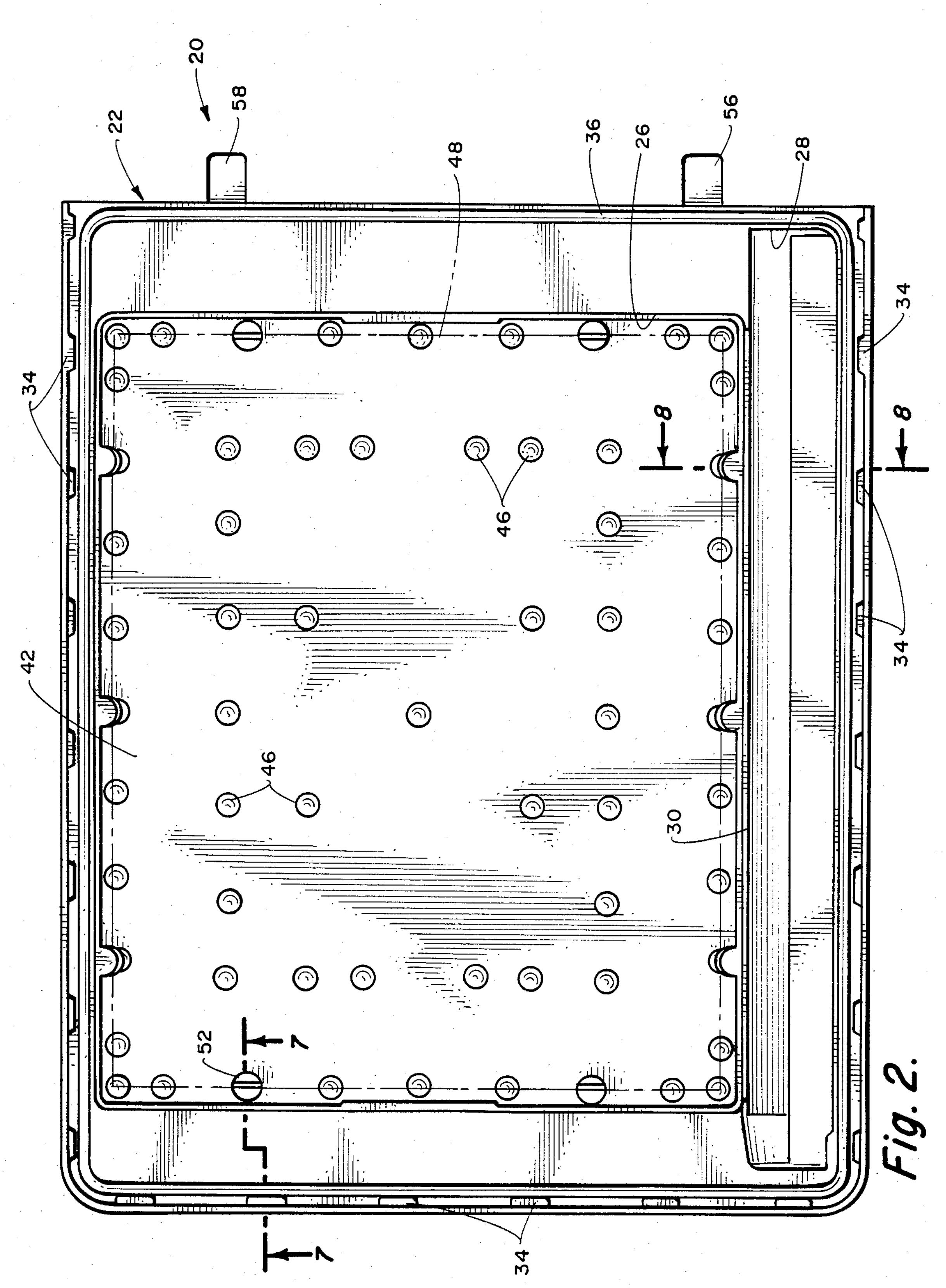
FIG. 2 is a top, plan view of the print making and developing tray of the present invention similar to FIG.
Figure 3:
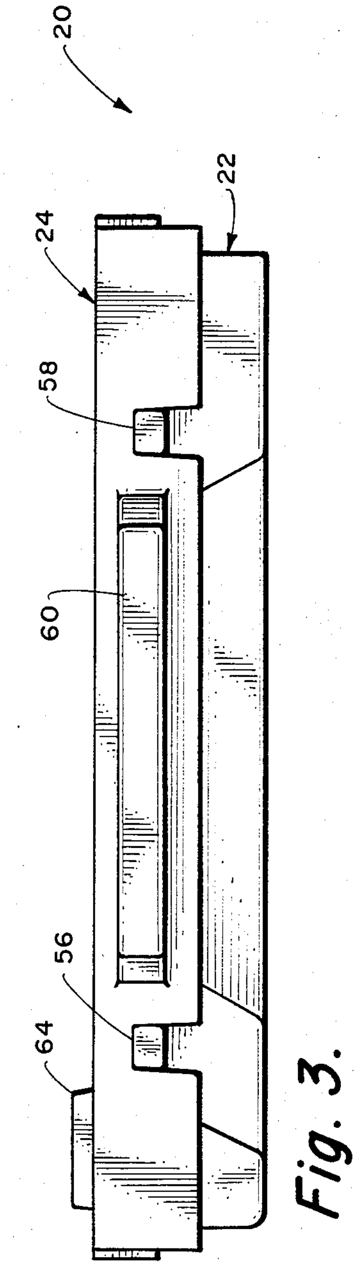
Figure 4:
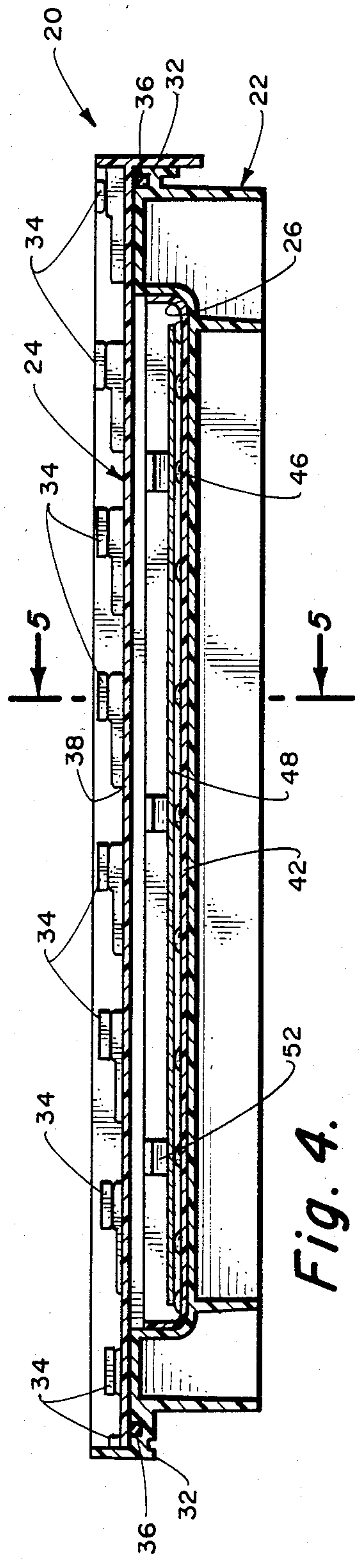
Figure 5:
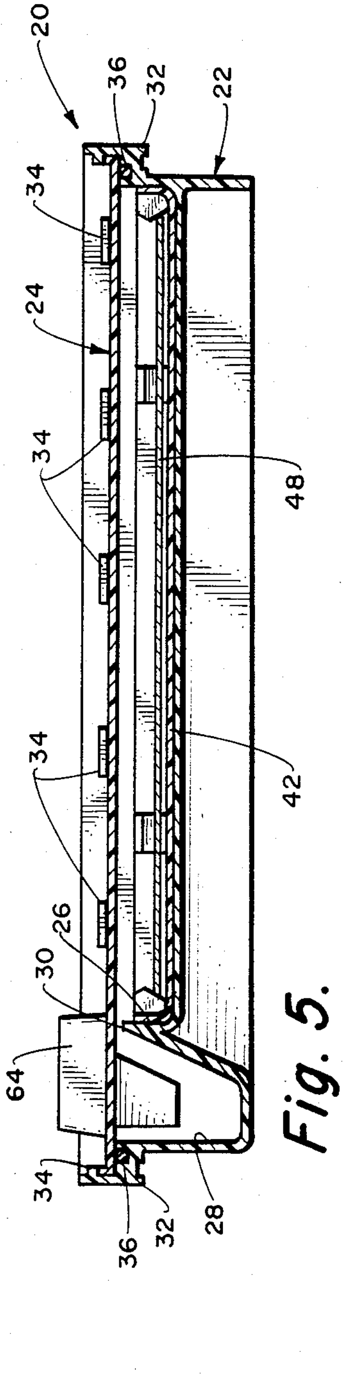
Figure 6:
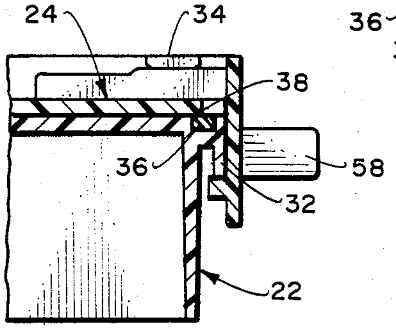
Figure 7:
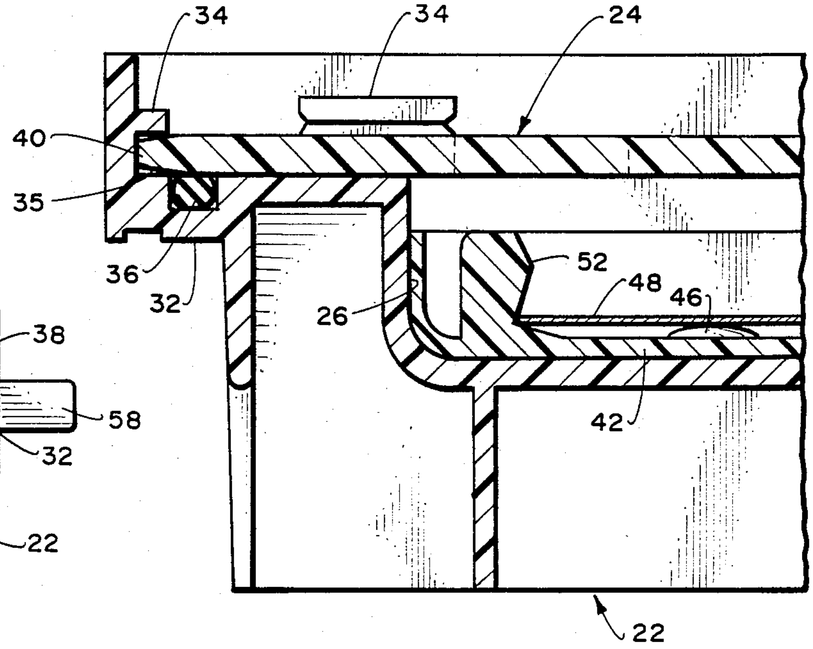
Figure 8:
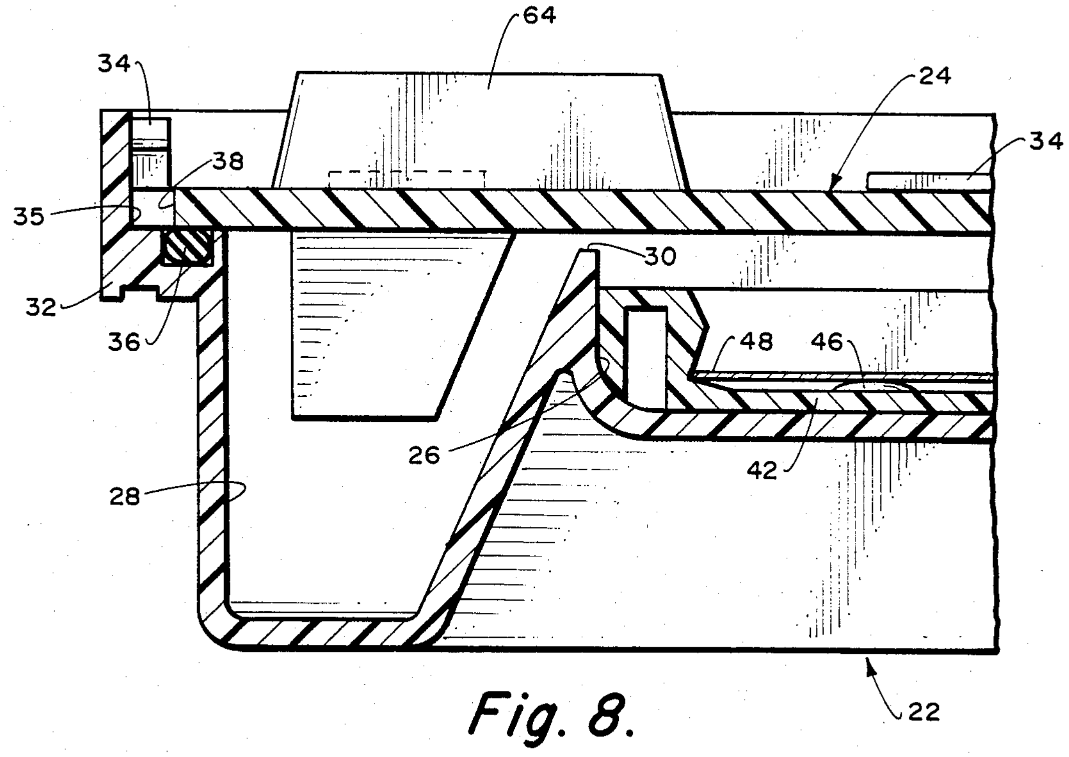
Figure 9:
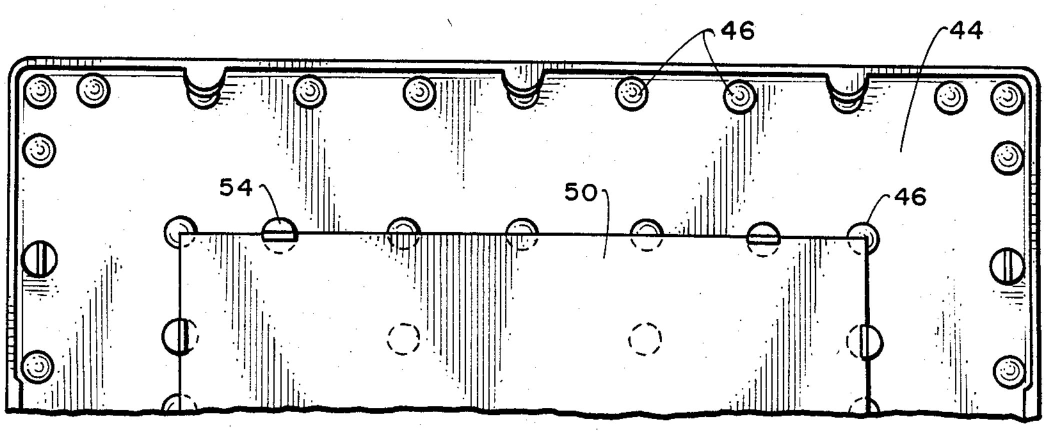
Figure 10:
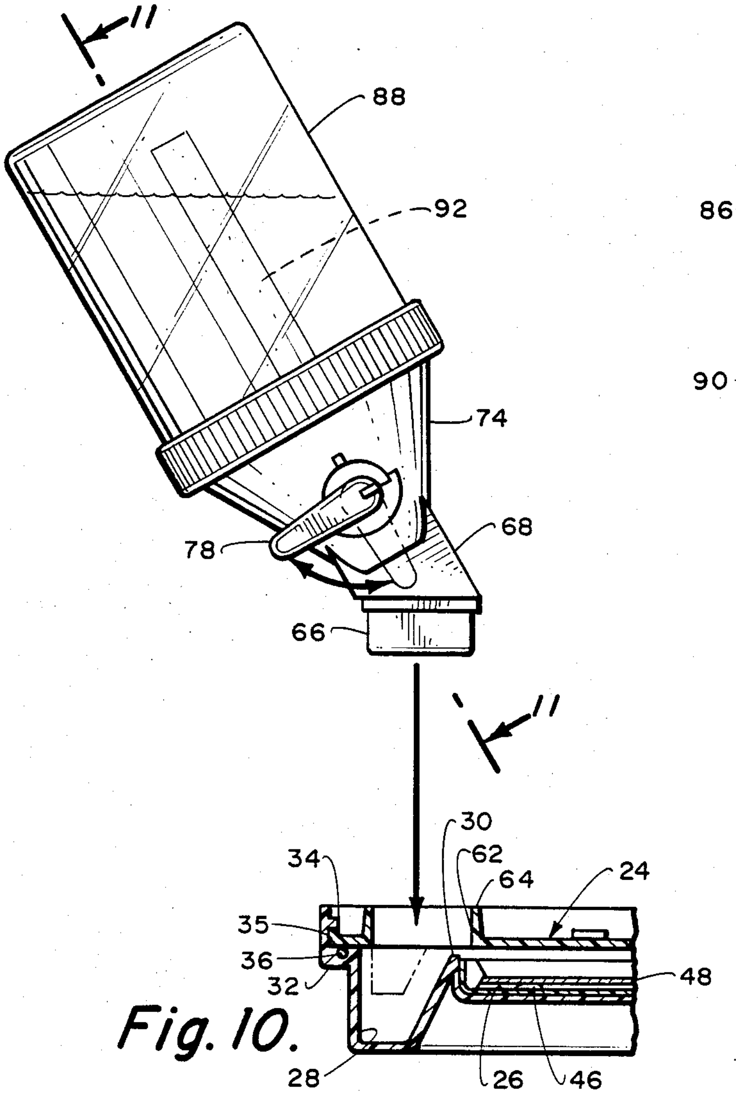
Figure 11:
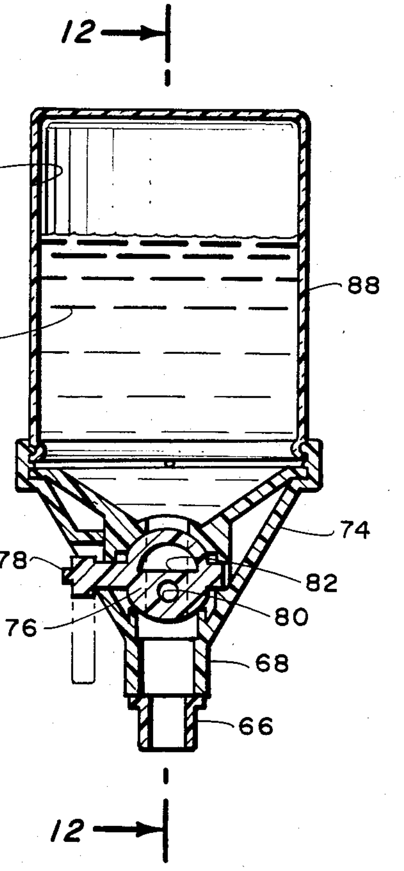
Figure 12:
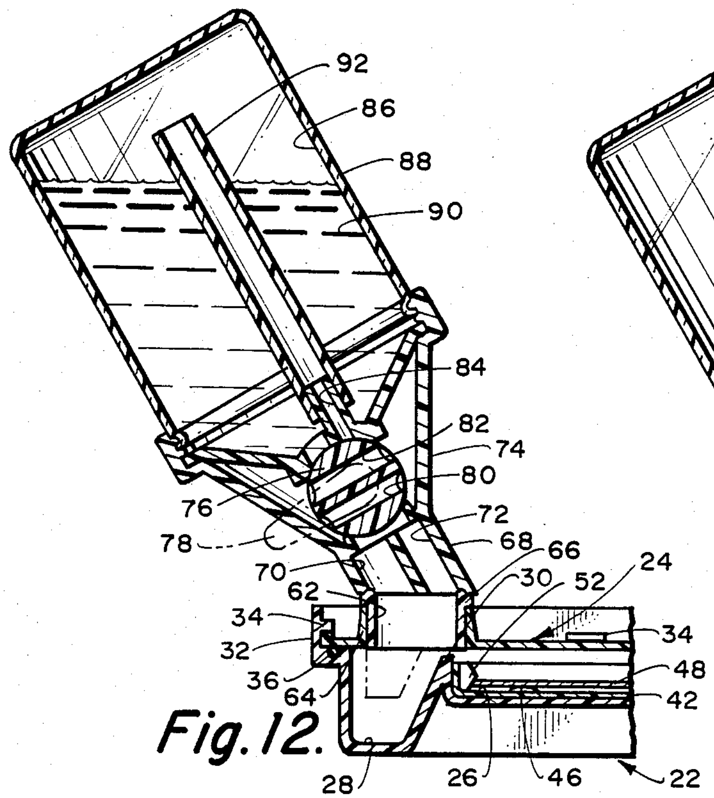
Figure 13:
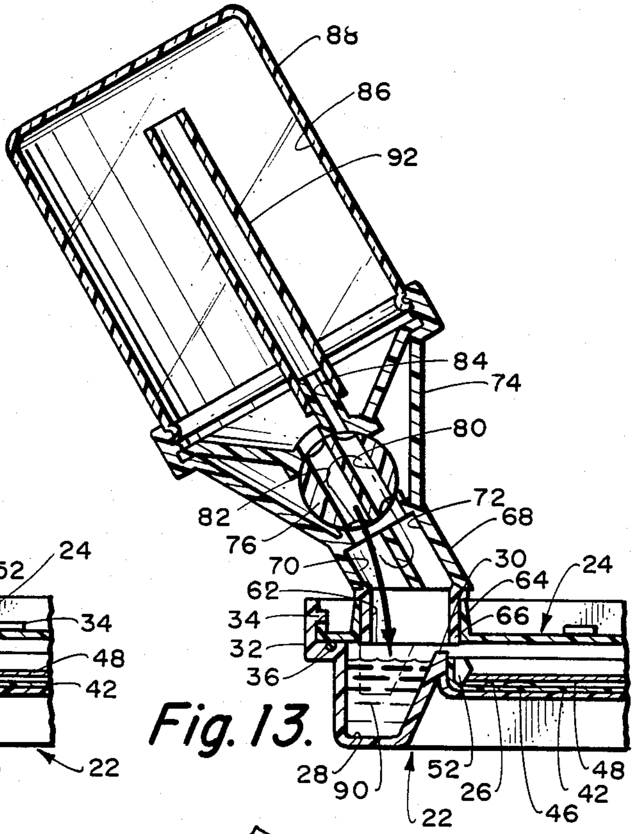
Figure 14:
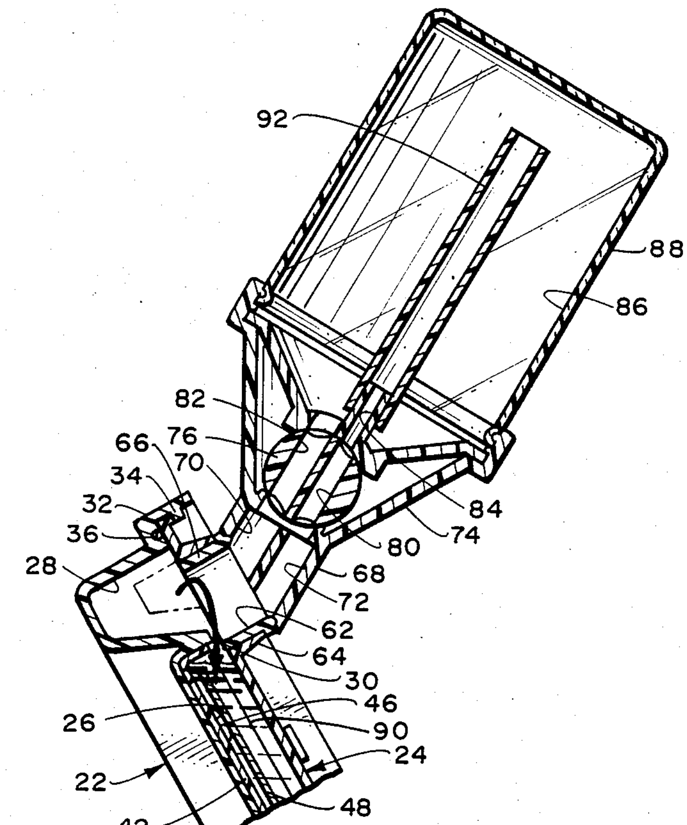
Figure 15:
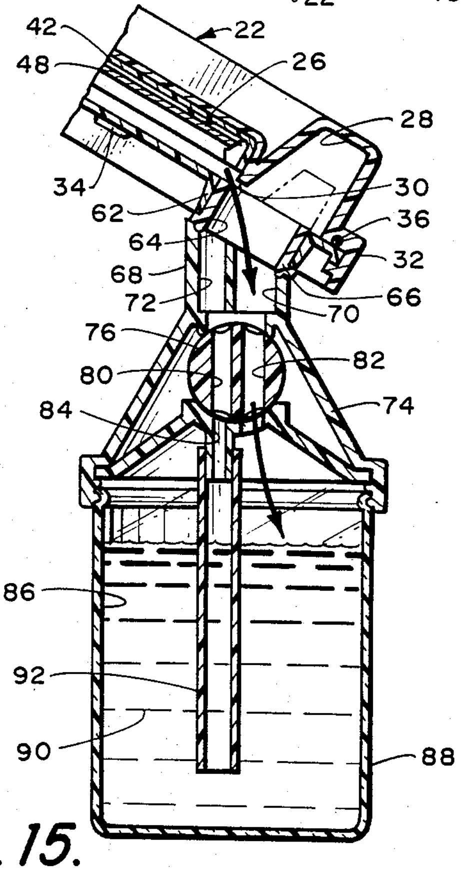

1 but showing the removable cover removed from the tray housing;

FIG. 3 is a right side elevational view of the print making and developing tray of the present invention taken along line 3—3 of FIG. 1;

FIG. 4 is a cross-sectional view taken along line 4—4 of FIG. 1 clearly showing the stepped rail configuration which removably connects the cover to the tray housing;

FIG. 5 is a cross-sectional view taken along line 5—5 of FIG. 4;

FIG. 6 is a cross-sectional view through a portion of the handle assembly utilized in conjunction with the print making and developing tray of the present invention taken along line 6—6 of FIG. 1;

FIG. 7 is a cross-sectional view taken along line 7—7 of FIG. 2;

FIG. 8 is a cross-sectional view taken along line 8—8 of FIG. 2;

FIG. 9 is a top, plan, elevational view of a portion of a different configuration of insert which could be located within the internal chamber of the tray housing of the present invention;

FIG. 10 is a side-elevational view showing the developing liquid dispenser to be utilized in conjunction with the tray housing of the present invention showing the dispenser spaced from the tray housing;

FIG. 11 is a cross-sectional view of the dispenser taken along line 11—11 of FIG. 10;

FIG. 12 is a cross-sectional view of the developing liquid dispenser showing the valve assembly, included within the dispenser, in the closed position and the dispenser connected to the print making and developing tray;

FIG. 13 is a view similar to FIG. 12 but showing the valve in the open position;

FIG. 14 is a view similar to FIG. 13 but depicting tilting of the print developing tray housing to a position to develop the exposed photographic print which is contained within the internal chamber of the tray housing; and FIG. 15 is a cross-sectional view similar to FIG. 13 but showing the tray housing being tilted to a position to permit the developing fluid to flow from the print developing tray housing back into the developing liquid dispenser.

DETAILED DESCRIPTION OF THE SHOWN EMBODIMENT

Referring particularly to the drawings, there is shown a tray assembly 20 which is generally composed of a tray housing 22 and a cover 24. The tray housing 22 has an internal chamber 26. The internal chamber 26 connects with an elongated channel 28. A ridge 30 separates the channel 28 from the internal chamber 26.

Surrounding the internal chamber 26 is the peripheral edge of the tray housing 22 which is formed into a flange 32. Attached to the flange 32 are a series of locking tabs 34. These locking tabs 34 form a stepped configuration on both sides of the flange 32, as well as one end wall of the flange 32. The locking tabs 34 form a space between the tabs 34 and the flange 32 which can be referred to as a groove. The cover 24 is to be located within this groove. The stepped configuration of the locking tabs 34 is such that as the cover 24 is moved to the closed position, the cover 24 is pressed tightly against O-ring seal 36, which is formed within the flange 32.

It is to be noted that the side edges of the cover 24 includes a plurality of evenly spaced apart notches 38. Due to the use of the notches 38, the cover 24 only needs to be moved from a closed position a distance of one to two inches until each notch 38 aligns with a locking tab 34. At this particular time, the cover 24 can then be moved directly away from the tray housing 22 therefore not requiring that the cover 24 need be entirely slid from the groove before disengagement with the tray housing 22. It is to be noted that for a complete description of the stepped rail assembly in conjunction with the print developing tray, reference may be had to the aforementioned patent application.

Referring particularly to FIG. 7 of the drawings, it can be seen that the side edges of the cover 24 are each chamfered to form smaller thickness side edges 40. The beveled edges 40 facilitate the locating of the cover 24 within the grooves 35 and the sliding of the cover 24 within the grooves 35.

Internal chamber 26 is substantially planar with upstanding sidewalls extending thereabout. Connectable with the internal chamber 26 are one or more inserts with inserts 42 and 44 being shown. Insert 42 is shown particularly in FIGS. 2, 7 and 8, with insert 44 being shown in FIG. 9.

Each of the inserts 42 and 44 include substantially planar upper surfaces which are formed to include a series of bumps 46. The unexposed photographic print 48 (usually formed of paper sheet material) is to be located on the bumps 46. The bumps 46 function to support the print 48 slightly spaced off the surface of the insert 42 (same for insert 44), so that developing fluid has a chance to come into contact with both the upper and lower sides of the exposed print 48.

It is to be noted that the print 48 is of a particular size, such as eight inches by ten inches and the insert 42 is designed to accommodate only this specific size of print. It is to also be noted that the print 50, which connects with the insert 44 shown within FIG. 9, is to accommodate a different size of print such as five inches by seven inches.

The print 48 is to be supported between spaced-apart, slightly bendable upstanding protuberances 52. Similar protuberances 54 are utilized to support the print 50. It is to be noted that each of the protuberances 52 and 54 have outwardly extending protrusions which each of the prints must pass in order to rest on the bumps 46. These protrusions function to assist holding in the correct position the prints 48 or 50 to keep it flush against the bumps 46.

When the cover 24 is in the closed position, it is tightly pressing against the seal 36 forming a liquid-tight connection between the cover and the tray housing 22. In order to effect removal of the cover 24, it is necesary to overcome this tight securing force. In order to achieve this easily, there are a pair of spaced-apart enlarged protuberances 56 and 58 formed on the front side of the tray housing 22. Mounted on the front side of the cover 24 is a handle 60. The operator is to grasp the handle 60 and by placing a thumb against either protuberance 56 or 58, exertion of a slight withdrawing force easily causes removal of the cover 24 from the tray housing 22. In essence, the handle 60 and the protuberances 56 or 58 function together as a fulcrum to facilitate the applying of torque to remove the cover 24.

Included within the cover 24 is an opening 62. Surrouding the opening 62 is a connecting sleeve 64. The opening 62 connects with the elongated channel 28.

A spout extension 66 is to snugly engage in a liquid-tight manner with the opening 62 within the connecting sleeve 64. The spout extension 66 is integrally attached to a spout 68. It is to be noted that the longitudinal center axis of the spout extension 66 is included with respect to the longitudinal center axis of the spout 68. The reason for this will be explained further on in the specification.

The spout 68 includes a liquid passage 70 and an air passage 72. The spout 68 is integrally attached to a spout housing 74. Movably mounted within the spout housing 74 is a valve spool 76. The valve spool 76 can be moved by means of an exterior located handle 78. Within the valve spool 76 is also an air passage 80 and a liquid passage 82. The valve spool 76 is to be movable between a closed position and an open position. When in the closed position, there is no conducting of either air or liquid through the passages 80 and 82 within the valve spool 76. With the valve spool 76 in the open position, air is capable of being conducted through the air passages 72 and 80 and into air pipe 84. At the same time, liquid is capable of being conducted through the passage 82 from the internal chamber 86 of a container 88. The container 88 is threadably secured onto the spout housing 74. The threaded securement is to facilitate removal of the container 88 and refilling of such with liquid 90. The liquid 90 is to constitute a photographic film developing liquid which is deemed to be conventional and forms no specific part of this invention.

The air pipe 84 is connected to an air tube 92. The air tube 92 is open at its outer end and is located substantially directly adjacent the bottom of the container 88.

After the print 48 or 50 has been exposed, the operator then takes the container 88 which contains the developing liquid 90 and with the valve spool 76 in the closed position, locates the spout extension 66 within the opening 62 of the connecting sleeve 64 forming a snug, connection therebetween. This connection is clearly shown in FIG. 12 of the drawings. The operator then manually pivots the handle 78, which causes the valve spool 76 to move the to the open position as shown in FIG. 13. The liquid 90 is permitted to flow into the elongated chamber 28. In order to assist this flow, air that has accumulated within the elongated chamber 28 is permitted to pass through air passages 72 and 80, through the air pipe 84 and the air tube 92, into the internal chamber 86 of the container 88.

With the liquid 90 now located totally within the elongated chamber 28, the operator proceeds to tilt or tip the tray assembly 20 until the liquid 90 will flow into the internal chamber 26 and come into contact with the print, either print 48 or 50.

After the developing liquid has been left in contact with the print for the desired amount of time, the operator then turns the print developing tray assembly 20 upside down which will then cause the developing liquid to be conducted from the internal chamber 26 and pass by the elongated chamber 28 and flow back through the passages 70 and 82 back into the internal chamber 86 of the container 88. After the liquid 90 has been completely drained from the tray assembly, the operator then moves the valve spool 76 to the closed position and then locates the tray assembly in the upright position, as shown in FIG. 12. The operator then can remove the cover 24 and remove the now developed photographic print from the internal chamber 26.

In order to facilitate "copying" of the picture that will be produced from either the print 48 or 50, there is formed on the exterior surface of the cover 24 a focusing target 94. The focusing target 94 includes an enlarged center area with a shaded peripheral edge 96. The shaded peripheral edge 96 is to facilitate orienting the image at the desired position so that it will be oriented in a similar desired position with respect to the print 48. Within the target 94, there is a dotted line area 95 which is to be used as the focusing target for the print 50.

What is claimed is:

1. A photographic print making and developing tray comprising:

a tray housing formed of a bottom wall and a side wall located about the periphery of said bottom wall, said side wall enclosing an internal chamber, the uppermost edge of said sidewall forming an access opening, engaging means connected to said sidewall assembly at said access opening, said internal chamber being divided into a planar section and an elongated channel;

a cover to connect in a closed position with said engaging means in a light-tight manner, said cover being slidably movable to an open position permitting unrestricted access into said planar section;

an aperture formed within said cover, connecting means surrounding said aperture, said aperture being adapted to pass a liquid into said elongated channel with said cover in said closed position, upon said tray housing being sufficiently tipped the liquid is caused to come into contact with said planar section substantially covering such; and a container adapted to contain the liquid, said container having a spout, a passage assembly formed within said spout, said spout to removably connect in a liquid tight manner with said connecting means to permit the liquid to flow through said passage into said elongated channel of said tray housing.

2. The photographic print making and developing tray as defined in claim 1 wherein:

during connection of said spout with said connecting means the said container being turned substantially up-side-down from its normally at rest position.

3. The photographic print making and developing tray as defined in claim 2 wherein:

said container including a valve assembly, said valve assembly connecting with said passage assembly, said valve assembly being movable between an open position and a closed position, with said valve assembly in said open position the liquid is to flow through said passage assembly, with said valve assembly in said closed position the liquid is prevented from flowing through said passage assembly.

4. The photographic print making and developing tray as defined in claim 1 wherein:

said container including a valve assembly, said valve assembly connecting with said passage assembly, said valve assembly being movable between an open position and a closed position, with said valve assembly in said open position the liquid is to flow through said passage assembly, with said valve assembly in said closed position the liquid is prevented from flowing through said passage assembly.

5. The photographic print making and developing tray as defined in claim 4 wherein:

said passage assembly including an air passage, a tube connected to said air passage, said tube having a free open end, said free open end being located within the confines of said container and substantially directly adjacent the bottom of said container.

6. A photographic print making and developing tray comprising:

a tray housing formed of a bottom wall and a side wall located about the periphery of said bottom wall, said side wall enclosing an internal chamber, the uppermost edge of said sidewall forming an access opening, engaging means connected to said sidewall assembly at said access opening, said internal chamber being divided into a planar section and an elongated channel;

a cover to connect in a closed position with said engaging means in a light-tight manner, said cover being slidably movable to an open position permitting unrestricted access into said planar section;

an aperture formed within said cover, connecting means surrounding said aperture, said aperture being adapted to pass a liquid into said elongated channel with said cover in said closed position, upon said tray housing being sufficiently tipped the liquid is caused to come into contact with said planar section substantially covering such; and a plurality of different inserts, said inserts to be locatable within a said planar section, each of said inserts to connect with only a specific size of photographic paper, each of said inserts for correctly positioning said photographic paper within said tray housing by being disposed peripherally around said photographic paper, each said insert to be removably connected with said tray housing.

7. The photographic print making and developing tray as defined in claim 6 wherein:

each said insert includes a series of spaced-apart bumps, said bumps to cause said photographic paper to lie slightly off the surface of said insert to permit the conducting of said liquid across the bottom surface of said photographic paper.

8. A photographic print making and developing tray comprising:

a tray housing formed of a bottom wall and a side wall located about the periphery of said bottom wall, said side wall enclosing an internal chamber, the uppermost edge of said sidewall forming an access opening, engaging means connected to said sidewall assembly at said access opening, said internal chamber being divided into a planar section and an elongated channel;

a cover to connect in a closed position with said engaging means in a light-tight manner, said cover being slidably movable to an open position permitting unrestricted access into said planar section;

an aperture formed within said cover, connecting means surrounding said aperture, said aperture being adapted to pass a liquid into said elongated channel with said cover in said closed position, upon said tray housing being sufficiently tipped the liquid is caused to come into contact with said planar section substantially covering such;

a plurality of different inserts, said inserts to be locatable within a said planar section, each of said inserts to connect with a specific size of photograph paper, each said insert to be removably connected with said tray housing, each said insert includes a series of spaced-apart bumps, said bumps to cause said photographic paper to lie slightly off the surface of said insert to permit the conducting of the liquid across the bottom surface of said photographic paper; and a container adapted to contain the liquid, said container having a spout, a passage assembly formed within said spout, said spout to removably connect in a liquid tight manner with said connecting means to permit the liquid to flow through said passage into said elongated channel of said tray housing.

9. The photographic print making and developing tray as defined in claim 8 wherein:

said container including a valve assembly, said valve assembly connecting with said passage assembly, said valve assembly being movable between an open position and a closed position, with said valve assembly in said open position the liquid is to flow through said passage assembly, with said valve assembly in said closed position the liquid is prevented from flowing through said passage assembly.

10. The photographic print making and developing tray as defined in claim 9 wherein:

said engaging means including a groove assembly formed within said tray housing.

11. The photographic print making and developing tray as defined in claim 10 wherein:

said engaging means includes a seal, said seal being located between said tray housing and said cover.

12. The photographic print making and developing tray as defined in claim 11 wherein:

securing means for tightly connecting together said cover and said tray housing tightly pressing said seal only when said cover is in said closed position.

* * * * *